(12) United States Patent
Ferroni et al.

(10) Patent No.: US 11,598,008 B2
(45) Date of Patent: Mar. 7, 2023

(54) METHODS FOR MANUFACTURING NANOSTRUCTURED AND COMPOSITIONALLY-TAILORED TUBES AND COMPONENTS BY LOW TEMPERATURE, SOLID-STATE COLD SPRAY POWDER DEPOSITION

(71) Applicant: Westinghouse Electric Company LLC, Cranberry Township, PA (US)

(72) Inventors: Paolo Ferroni, Pittsburgh, PA (US); Peng Xu, Columbia, SC (US); Michael Ickes, Pittsburgh, PA (US); Hwasung Yeom, Madison, WI (US); Kumar Sridharan, Madison, WI (US); Benjamin R. Maier, Pittsburgh, PA (US); Greg O. Johnson, Madison, WI (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 266 days.

(21) Appl. No.: 16/878,523

(22) Filed: May 19, 2020

(65) Prior Publication Data
US 2021/0363645 A1 Nov. 25, 2021

(51) Int. Cl.
*C23C 24/04* (2006.01)
*C22C 38/06* (2006.01)
*C22C 38/18* (2006.01)

(52) U.S. Cl.
CPC .............. *C23C 24/04* (2013.01); *C22C 38/06* (2013.01); *C22C 38/18* (2013.01)

(58) Field of Classification Search
CPC ......... C23C 24/04; C23C 38/06; C23C 38/18; C23C 24/00; C23C 24/08; C23C 24/082;
(Continued)

(56) References Cited

U.S. PATENT DOCUMENTS 8,609,187 B1 * 12/2013 Kang .................... C22C 19/058
427/427
10,281,227 B1 * 5/2019 Champagne .......... C23C 28/324
(Continued)

FOREIGN PATENT DOCUMENTS

| EP | 1659195 A2 | 5/2006 |
|----|------------|--------|
| EP | 2262922 B1 | 4/2015 |

OTHER PUBLICATIONS

International Search Report and Written Opinion for International PCT Application No. PCT/US2021/032576, dated Jul. 30, 2021.
(Continued)

*Primary Examiner* — Anthony M Liang
*Assistant Examiner* — Danny N Kang
(74) *Attorney, Agent, or Firm* — K&L Gates LLP

(57) ABSTRACT

Disclosed is a method for manufacturing free-standing cladding tubes with multi-layer structures. According to the method, a cylindrical mandrel substrate defining a hollow cylindrical inner space is provided. A first cold spray powder metal is selected. The cylindrical mandrel substrate is rotated and the first cold spray powder metal is applied to an outer surface of the cylindrical mandrel substrate to form a first layer. The cylindrical mandrel substrate is removed.

20 Claims, 7 Drawing Sheets

(58) Field of Classification Search
CPC ... C23C 24/085; C23C 24/087; C23C 28/021; C23C 28/022; C23C 28/023; C23C 30/00; C23C 28/02
See application file for complete search history.

(56) References Cited

U.S. PATENT DOCUMENTS

| | | |
|---|---|---|
| 2005/0100756 A1 | 5/2005 | Langan et al. |
| 2009/0026659 A1* | 1/2009 | Vontell, Sr. ............. B29C 70/48 425/589 |
| 2019/0234697 A1 | 8/2019 | Chipko et al. |

OTHER PUBLICATIONS

Lenling et al., Manufacturing Oxide Dispersion-Strengthened (ODS) Steel Fuel Cladding Tubes Using the Cold Spray Process, JOM (Jun. 11, 2019), 71:2868-2873.

Maier et al., A novel approach for manufacturing oxide dispersion strengthened (ODS) steel cladding tubes using cold spray technology, Nuclear Engineering and Technology (Jan. 24, 2019), 51:1069-1074.

Sridharan to develop ODS fuel cladding (May 21, 2014); https://www.engr.wisc.edu/news/sridharan-to-develop-ods-fuel-cladding/.

Hoon et al., Spray of Mechanically Alloyed F/M-ODS Steel Powder (2016); https://inis.iaea.org/search/search.aspx?brig_q=RN:48048702.

\* cited by examiner

METHODS FOR MANUFACTURING NANOSTRUCTURED AND COMPOSITIONALLY-TAILORED TUBES AND COMPONENTS BY LOW TEMPERATURE, SOLID-STATE COLD SPRAY POWDER DEPOSITION

TECHNICAL FIELD

The present disclosure relates generally to methods for manufacturing nanostructured and compositionally-tailored tubes and components. More particularly, the present disclosure relates to methods for manufacturing nanostructured and compositionally-tailored tubes and components by low temperature, solid-state cold spray powder deposition. Applications include, for example, nuclear reactor cladding tubes that house the uranium-based fuel.

BACKGROUND

Conventional melting and casting approaches are not suitable for manufacturing oxide dispersion strengthened (ODS) steels as they lead to upward stratification of oxide nanoparticles. FIG. 1 illustrates a method 100 for manufacturing nanostructured ODS steel cladding tubes 114. Thus, as shown in FIG. 1, solid-state processing approaches involving a combination of powder consolidation and extrusion to manufacture ODS steel cladding tubes 114. According to the method 100, the milled powders 102 are canned and degassed in vacuum at about 400° C. and mechanically alloyed 104 to produce a mechanical alloy (MA) powder tube 106 encased in low carbon steel followed by hot extrusion 108 at about 1100° C. Matrix powder (ferritic steel) is milled with oxide nanoparticle first to make mechanically alloyed powder. And then the powder is consolidated by canning in the low carbon steel encase. The bulk material experiences hot/warm extrusion followed by multiple pilgering and intermediate heat treatment to make a final dimension. To reduce the diameter and the wall thickness of the tube 106 to the final cladding tube 114 dimensions further extrusion, up to ratios of 5 to 8, is required. This is achieved by multiple warm extrusions 108 conducted at a temperature of about 850° C. with intermediate annealing steps to avoid cracking. These multiple extrusions 108 result in large anisotropy in grain structure and mechanical properties. In order to produce fine equiaxed grains, further cold extrusion 110 with intermediate annealing treatments 112 are required to induce recrystallization. All these extrusion steps are inherently slow, low strain rate processes and are not amenable to fast and economical manufacturing of ODS steel cladding tubes 114. Furthermore, the large number of thermo-mechanical steps can lead to stochastic variations in microstructure and properties of the cladding tube 114.

Therefore, there is a need for a cold spray process to provide a rapid, cost-effective method for manufacturing ODS steel cladding tubes with a potentially more uniform microstructure and enhanced performance. There is a further need to apply the underlying principles described in the present disclosure to near-net shape manufacturing of other components and materials.

SUMMARY

In one aspect, the present disclosure provides a method for manufacturing free-standing cladding tubes with multi-layer structures. The method comprises providing a cylindrical mandrel substrate defining a hollow cylindrical inner space; selecting a first cold spray powder metal; rotating the cylindrical mandrel substrate; applying the first cold spray powder metal to an outer surface of the cylindrical mandrel substrate to form a first layer; and removing the cylindrical mandrel substrate.

In addition to the foregoing, various other methods are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein Further, it is understood that any one or more of the following-described forms, expressions of forms, examples, can be combined with any one or more of the other following-described forms, expressions of forms, and examples.

The foregoing summary is illustrative only and is not intended to be in any way limiting. In addition to the illustrative aspects, embodiments, and features described above, further aspects, embodiments, and features will become apparent by reference to the drawings and the following detailed description.

FIGURES

The novel features of the described forms are set forth with particularity in the appended claims. The described forms, however, both as to organization and methods of operation, may be best understood by reference to the following description, taken in conjunction with the accompanying drawings in which:

DESCRIPTION

Before explaining various aspects of methods for manufacturing nanostructured and compositionally-tailored tubes and components and more particularly, methods for manufacturing nanostructured and compositionally-tailored tubes and components by low temperature, solid-state cold spray powder deposition, in detail, it should be noted that the illustrative aspects are not limited in application or use to the details of construction and arrangement of parts illustrated in the accompanying drawings and description. The illustrative aspects may be implemented or incorporated in other aspects, variations and modifications, and may be practiced or carried out in various ways. Further, unless otherwise indicated, the terms and expressions utilized herein have been chosen for the purpose of describing the illustrative aspects for the convenience of the reader and are not for the purpose of limitation thereof.

Further, it is understood that any one or more of the following-described forms, expressions of forms, examples, can be combined with any one or more of the other following-described forms, expressions of forms, and examples.

In one aspect, the present disclosure is directed to, as stated above, methods for manufacturing nanostructured and compositionally-tailored tubes and components. In other aspects, the present disclosure is directed to methods for manufacturing nanostructured and compositionally-tailored tubes and components by low temperature, solid-state cold spray powder deposition.

Oxide dispersion strengthened (ODS) steels are good cladding candidate materials for Generation IV nuclear reactors such as lead fast reactors (LFR), micro reactors, and potentially fossil plant boiler tube applications due to their superior high temperature strength and irradiation stability. ODS steels, however, may lack corrosion resistance in certain environments at high temperatures not commensurate with the improved high temperature strengths that such steels can provide. Additionally, in the nuclear fuel cladding application, the inner surface of the cladding tube contacts the fuel and over time at high temperatures low melting point compounds can form due to interdiffusion between the tube and fuel materials.

Processes involving melting and solidification cannot produce nano-scale ODS steels because oxide particles will agglomerate leading to macro-scale inhomogeneity. Melting and solidification methods to produce oxidation-resistant corrosion-resistant coatings or inner diffusion barrier coatings can lead to a loss of the fundamental nanostructure qualities of ODS steels. Even high temperature, high pressure solid-state coating treatments may lead to similar effects.

Figure 1:
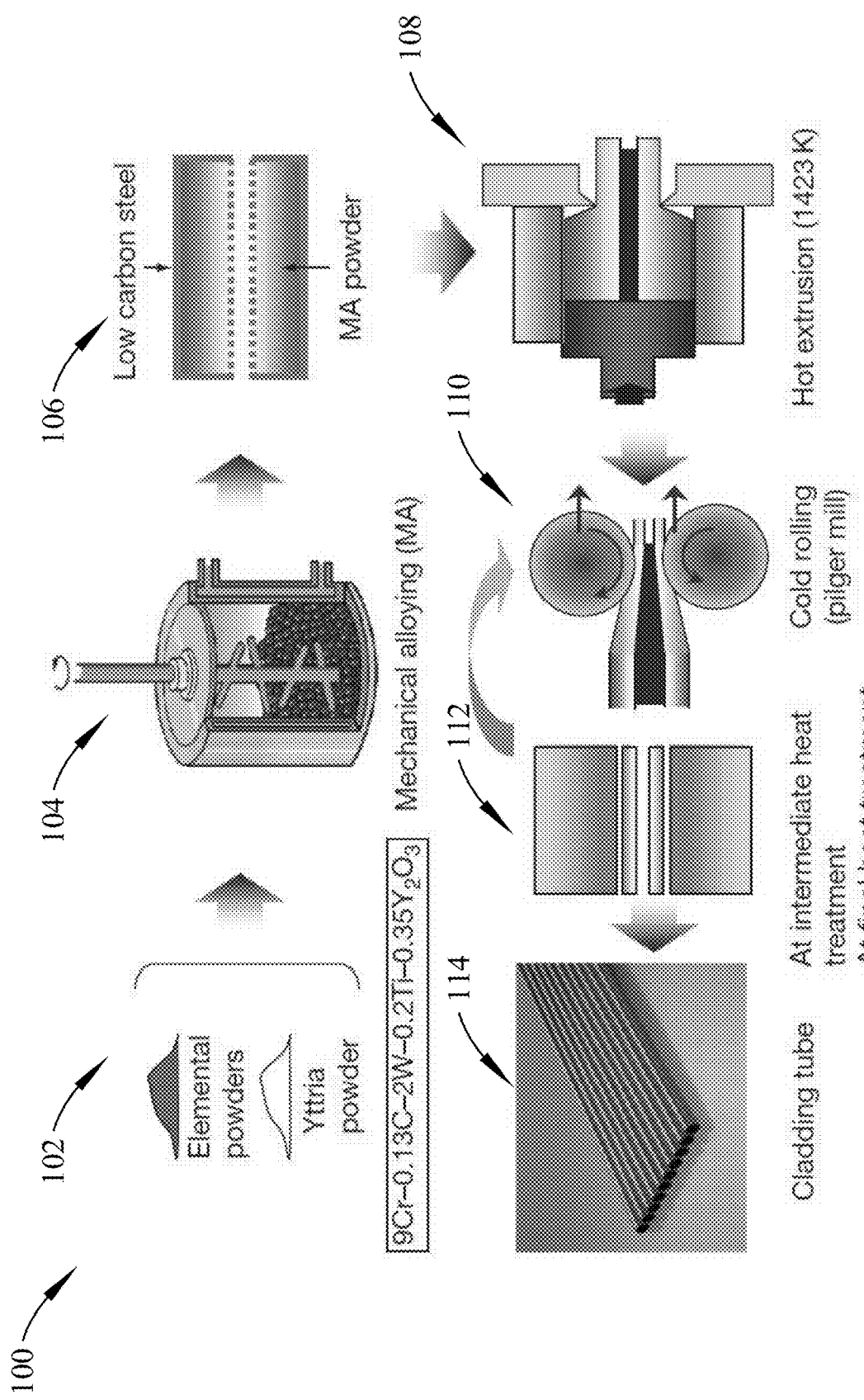
FIG. 1 illustrates a process for typical manufacturing nanostructured ODS steel cladding tubes.

In accordance with aspects of the present disclosure, a low-temperature, solid-state cold spray process is used and essential for the preservation of nanostructures in ODS steel tube claddings. The cold spray process is fast and can be used for rapid prototyping/manufacture, unlike the present-day extrusion-anneal-extrusion processes, such as those described in FIG. 1.

In accordance with aspects of the present disclosure, stochastic variations in microstructure are minimized due to elimination of multiple processing steps. High energy input to make tubes and high temperatures are not or minimally involved. Although it is very challenging to line the inside surfaces of long low diameter tubes, in one aspect, the present disclosure provides a method for manufacturing long low diameter tubes quite readily by an alternative technologically smaller, superior, and more cost-effective process. For fabricating liners on the inside surfaces of tubes, the process according to the present disclosure eliminates the issues related to differential thermo-mechanical properties (behavior) between the two materials which can potentially lead to stresses and cracking during fabrication.

The cold spray process according to various aspects of the present disclosure is amenable to various types of powder forms including gas atomized spherical shaped powder, ball milled, or cryomilled powder, and post-heat treated powder produced by mechanical attrition. This allows optimization of the microstructure of ODS steel cladding tube and for the manufacturing of compositionally and functionally graded outer and inner coatings of possibly dissimilar composition for protection in various extreme environments. The latter vastly expands the capabilities of the high strength ODS cladding tubes for use in harsh environments while also eliminating its direct contact with the fuel.

Figure 2:
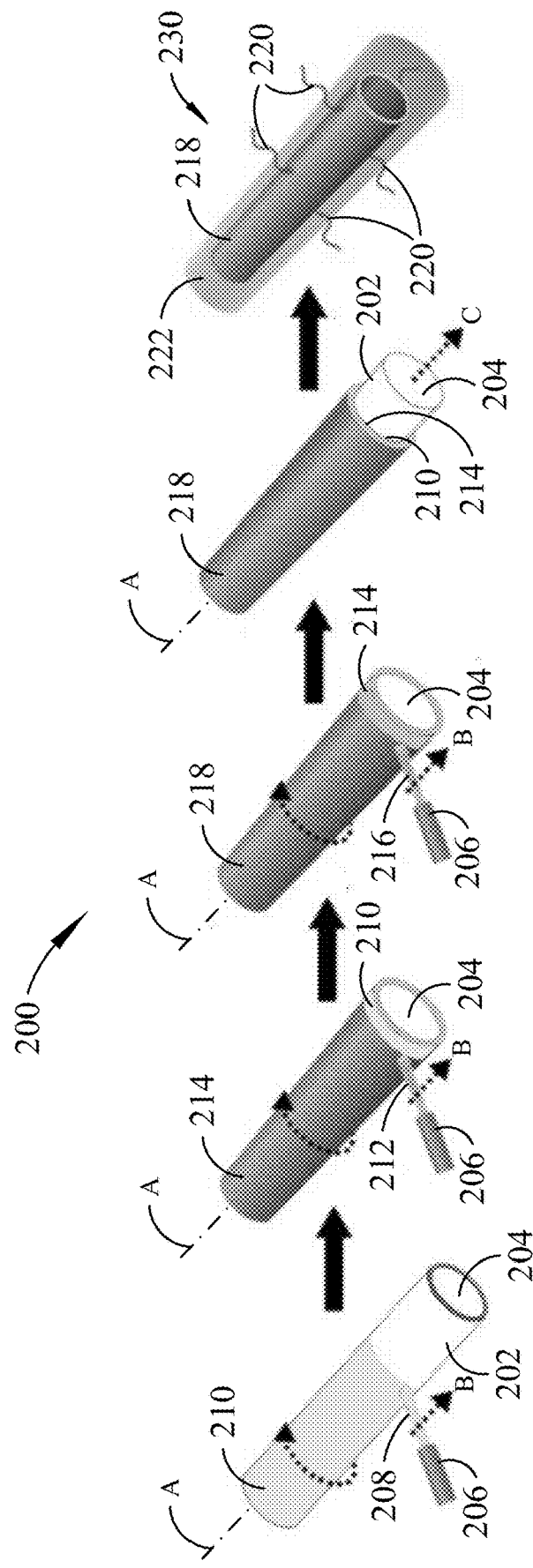
FIG. 2 illustrates a cold spray process for manufacturing free-standing ODS steel cladding tubes with multi-layer structures, according to at least one aspect of the present disclosure.

Turning now to the figures, FIG. 2 illustrates a cold spray process 200 for manufacturing free-standing nanostructured ODS steel cladding tubes with multi-layer structures using a cold (low temperatures) spray process, according to at least one aspect of the present disclosure. In one aspect, free-standing nanostructured ODS steel cladding tubes manufactured using the cold spray process 200 may comprise a multi-layer structure including an inner liner and/or an outer coating. Generally, powder material with nano-sized grain structure, in various forms are spray deposited at low temperatures onto the surface of a cylindrical mandrel substrate 202 defining a hollow cylindrical inner space 204 while the cylindrical mandrel substrate 202 is rotated about its longitudinal axis A. A powder inner liner material is loaded in a powder feeder/hopper in fluid communication with a powder spray nozzle 206. The powder spray nozzle 206 sprays a beam 208 of powdered inner liner material as the powder spray nozzle 206 is translated along the length of the cylindrical mandrel substrate 202 in a forward direction indicated by arrow B. This deposits an inner liner layer 210 on the outer surface of the cylindrical mandrel substrate 202. To increase the thickness of the inner liner layer 210, the powder spray nozzle 206 may be translated backward and forward over multiple passes to deposit additional inner liner material until a desired thickness of the inner layer 210 is achieved. In another aspect, translation speed could be lowered to increase coating thickness. Generally, layer thickness may be controlled by adjusting the translation or traverse speed of the powder spray nozzle 206. The inner liner layer 210 material may be nanoparticle sized powdered refractory metals and alloys that provides a diffusion barrier in nuclear power applications. Inner liner layer 210 materials include metals (and alloys) which exhibit generally low solid solubility in uranium and steels and have high melting points, including, but not limited to refractory alloys such as V, Mo, Mo—Re alloys, Ta, Nb, W, Cr, or Zr.

Next, an ODS steel layer 214 is produced by loading a powdered ODS steel material in the powder feeder/hopper, rotating the cylindrical mandrel substrate 202 about its longitudinal axis A, and spraying a beam 212 of powdered ODS steel material from the powder spray nozzle 206 while it is translated along the length of the cylindrical mandrel substrate 202 in the forward direction indicated by arrow B to deposit the ODS steel layer 214 over the inner liner layer 210. To increase the thickness of the ODS steel layer 214, the powder spray nozzle 206 may be translated backward and forward over multiple passes to deposit additional powdered ODS steel material until a desired thickness of the ODS steel layer 214 is achieved. The ODS steel layer 214 material may be nanostructured steel powder and acts as a cladding in nuclear power applications. The ODS steel layer 214 material may be selected from ODS steel and other alloys—with novel powder pre-preparation approaches such as cryogenic milling that can enhance microstructural homogeneity and properties, for example. Cryogenically milled ODS powder can produce a superior microstructure.

Next, an outer layer 218 is produced by loading a powdered outer coating material in the powder feeder/hopper, rotating the cylindrical mandrel substrate 202 about its longitudinal axis A, and spraying a beam 216 of powdered outer coating material from the powder spray nozzle 206 while it translates along the length of the cylindrical mandrel substrate 202 in the forward direction indicated by arrow B to deposit the outer layer 218 over the ODS steel layer 214 as the powder spray nozzle 206 is translated along its length in the forward direction indicated by arrow B to deposit the outer layer 218 over the ODS steel layer 214. To increase the thickness of the outer layer 218, the powder spray nozzle 206 may be translated backward and forward over multiple passes to deposit addition outer coating material until a desired thickness of the outer layer 218 is achieved. The outer layer 218 material may comprise powdered material that provides corrosion and oxidation resistance for the ODS steel layers 214 in a variety of environments. Such materials include chromium and its alloys, iron, chromium, yttrium, silicon, nickel-, molybdenum-, and tungsten alloys, depending on the application. For light-water reactor (LWR) applications, the outer layer 218 materials may include Cr, FeCrAl. For lead-cooled fast reactor (LFR) applications, the outer layer 218 materials may include Mo, Mo—Re alloys, Nb, Ta, FeCrAl, FeCrAlY, FeCrSi. For molten salt reactor (MSR) applications, the outer layer 218 materials may include Ni-alloys, Mo-alloys, W-alloys. For fusion reactor applications, the outer layer 218 materials may include Be-alloys, W-alloys.

After the outer layer 218 is deposited to the desired thickness, the cylindrical mandrel substrate 202 is removed in the direction indicated by arrow C by a chemical dissolution process or low temperature thermal treatment depending on mandrel material, discussed in more detail hereinbelow. This leaves a free-standing ODS steel cladding tube 230 with a multi-layer structure. In other aspects, the cold spray process 200 may be employed to produce free-standing monolithic ODS steel cladding tubes.

The cold spray process 200 may be employed to produce free-standing ODS steel cladding tubes 230 of any suitable length. The length of tubes that can be produced by the cold spray process 200 depends on the length of the cylindrical mandrel substrate 202 and the translation limits of the powder spray nozzle 206. In nuclear power applications, the length of the free-standing ODS steel cladding tube 230 may be selected to accommodate various lengths of nuclear fuel rods in a core of a typical nuclear reactor. In one aspect of the present disclosure, the length of the free-standing ODS steel cladding tubes 230 may be selected from a range of 1.5 m (~5 ft.) to 5 m (~16.4 ft.). In another aspect, the length may be selected from a range of 2.5 m (~8.2 ft.) to 3.5 m (~11.5 ft.). In other aspects, the length may be selected as 4 m (~13 ft.) to accommodate a typically sized nuclear fuel rod.

In some aspects of the present disclosure, the free-standing ODS steel cladding tube 230 may be annealed by applying a thermal treatment that alters the physical and chemical properties of the inner liner, ODS steel, and outer coating materials. A typical annealing process involves heating 220 the free-standing ODS steel cladding tube 230 above a predetermined temperature and maintaining a suitable temperature 222 for an appropriate amount of time and then cooling. This achieves a dense microstructure, fine recrystallized grains, and oxide nanoparticle precipitation.

Important variables in the cold spray process 200 include propelling gas, gas pre-heat temperature and pressure, and powder shape, powder particle size and size distribution, and compositional homogeneity of powder.

In one aspect, the cold spray process 200 according to the present disclosure provides a highly unique dissolution process for removing the cylindrical mandrel substrate 202. In another aspect, the mandrel substrate 202 may be made of a low melting point metal which may be removed by heat treatment. Instead of using a solid mandrel, the cylindrical mandrel substrate 202 is a tube that defines a hollow cylindrical inner space 204 and is made of an aluminum-alloy material. After depositing the final layer of material onto the cylindrical mandrel substrate 202, the aluminum-alloy cylindrical mandrel substrate 202 tube is conveniently dissolved inside out using a sodium-hydroxide solution leaving behind the free-standing ODS steel cladding tube 230. In the example disclosed in FIG. 2, the final layer deposited layer is the outer layer 218. In other aspects, the final deposited layer may be the inner layer 210 or the ODS steel layer 214. Generally, the mandrel substrate 202 materials may include metals (and alloys) with low melting point or low boiling points, and metals (and alloys) that are readily soluble in non-toxic environmentally friendly solvents. For chemical dissolution removal, the mandrel substrate 202 materials may include Al, Al-alloys and Mg, Mg-alloys. For removal by heating above its melting point (~420° C.), the mandrel substrate 202 materials may include Zn and Zn-alloys.

Figure 3:
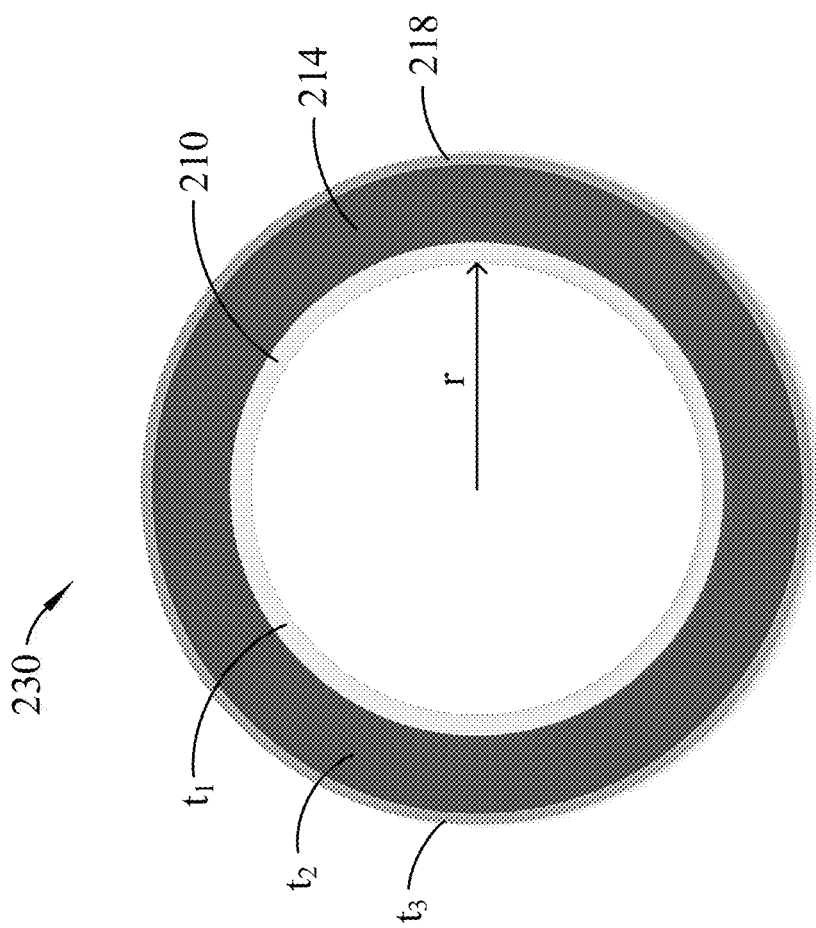
FIG. 3 is a section view of an ODS steel cladding tube with a multi-layer structure manufactured using the cold spray process illustrated in FIG. 2, according to at least one aspect of the present disclosure.

FIG. 3 is a section view of a free-standing ODS steel cladding tube 230 with a multi-layer structure manufactured using the cold spray process 200 illustrated in FIG. 2, according to at least one aspect of the present disclosure. The free-standing ODS steel cladding tube 230 comprises an inner layer 210, an ODS steel layer 214, and an outer layer 218 formed in accordance with the cold spray process 200 described with reference to FIG. 2. In one aspect, the diameter (2 r) of the free-standing ODS steel cladding tube 230 is selected from a range of 8 mm (~0.3 in.) to 15 mm (~0.6 in.). The layer 210, 214, 218 thickness $t_1$, $t_2$, $t_3$ may be defined as follows. In one aspect, the thickness $t_1$ of the inner layer 210 (e.g., the refractory layer) is selected from a range of 10 μm (~$3.94 \times 10^{-4}$ in.) to 200 μm (~$7.87 \times 10^{-3}$ in.). In one aspect, the thickness $t_2$ of the ODS steel layer 214 (e.g., the cladding layer) is selected from a range of 200 μm (~$7.87 \times 10^{-3}$ in.) to 1.00 mm (~$3.94 \times 10^{-2}$ in.). In one aspect, the thickness $t_3$ of the outer layer 218 (e.g., corrosion protective layer) is selected from a range of 1 μm (~$3.94 \times 10^{-5}$ in.) to 100 μm (~$3.94 \times 10^{-3}$ in.). The inner layer 210 acts as a diffusion barrier and the material may be a refractory metal comprising vanadium, tantalum, rhenium, niobium, tungsten, chromium, zirconium, or molybdenum, or combinations thereof. The ODS steel layer 214 cladding material may comprise ODS steel, for example. The outer layer 218 material may comprise chromium or chromium alloys, for example. The tri-material system shown in FIG. 3, produced in solid-state by the cold spray process 200 provides outstanding high temperature strength, corrosion resistance, and inner layer to prevent fuel migration into the cladding resulting in melted regions at low temperatures. The composition of the inner layer 210, ODS steel layer 214, and the outer layer 218 are described in more detail with reference to FIGS. 4 and 5.

Compositionally graded tubes, such as the free-standing ODS steel cladding tube 230, can be manufactured according to the cold spray process 200 described with reference to FIG. 2. A compositionally graded tube with a cross-section that reveals multiple layers of materials is shown in FIG. 3, for example. As shown in FIG. 3, the free-standing ODS steel cladding tube 230 is lined inside by an inner layer 210 that provides a diffusion barrier between the ODS steel layer 214 and the nuclear fuel. The free-standing ODS steel cladding tube 230 comprises an outer layer 218 acts as a protective outer layer, which provides corrosion/oxidation resistance to the free-standing ODS steel cladding tube 230 in high temperature, corrosive, and oxidative environments.

The alternative technology is very tedious. Coating for inner surface of tubes is very difficult due to slow process and non-uniformity of coating thickness particularly for narrow diameter tubes. Co-extrusion may used but it requires a large resource (e.g., power, force, time). Co-extrusion also is a technically challenging process due to mismatch of thermo-mechanical properties between the two materials, potentially resulting in failure of tubes during to process. Co-extrusion of a liner may require very high force, slow processes, and may not be viable for long tubes and all the associated drawbacks discussed earlier. Furthermore, for fabricating liners on the inside surfaces of tubes, the cold spray process 200 described with reference to FIG. 2 eliminates the issues related to differential mechanical properties (behavior) between the two materials which can potentially lead to stresses and cracking during fabrication.

In one aspect, the inner layer 210 material is vanadium or vanadium alloy because of its applicability to nuclear reactors. The inner layer 210 material, however, is not limited thereto. In a nuclear reactor, the uranium-dioxide fuel pellets are placed inside an ODS steel cladding tube. Over time the fuel swells and makes contact with the inner surface of the cladding and a chemical reaction will occur between the two. This is undesirable because such a reaction can lead to formation of low-melting point compounds at the interface. The vanadium inner layer 210 of the free-standing ODS steel cladding tube 230 is an excellent barrier to prevent such a reaction from occurring. There are numerous other applications in the industry where compositionally tailored tubes, such as the free-standing ODS steel cladding tube 230, can satisfy multiple property requirements typically required in harsh environments.

Similarly, the outer surface of the free-standing ODS steel cladding tube 230 may be expected to be exposed to very harsh high temperature oxidative environments and would require an outer layer 218 coating that provides corrosion-resistance at high temperatures where the free-standing ODS steel cladding tube 230 are expected to be used. Here again, high temperature methods are not suitable as they will have an effect on the nanostructure of the base ODS steel.

Figure 4:
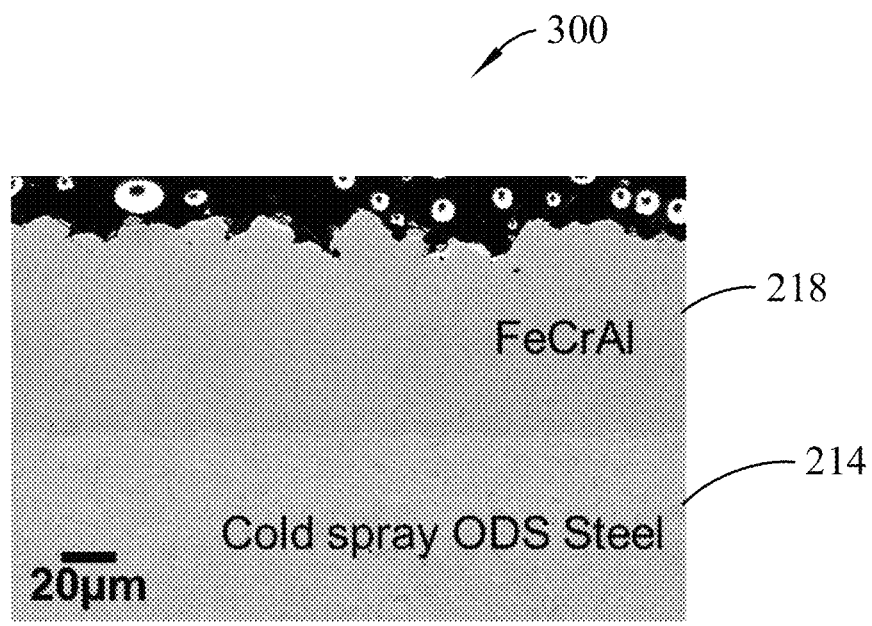
FIG. 4 is a micrograph section view of a free-standing ODS steel cladding tube comprising an ODS steel material with a protective outer coating with an iron-chromium-aluminum alloy produced using the cold spray process of FIG. 2, according to at least one aspect of the present disclosure.
Figure 5:
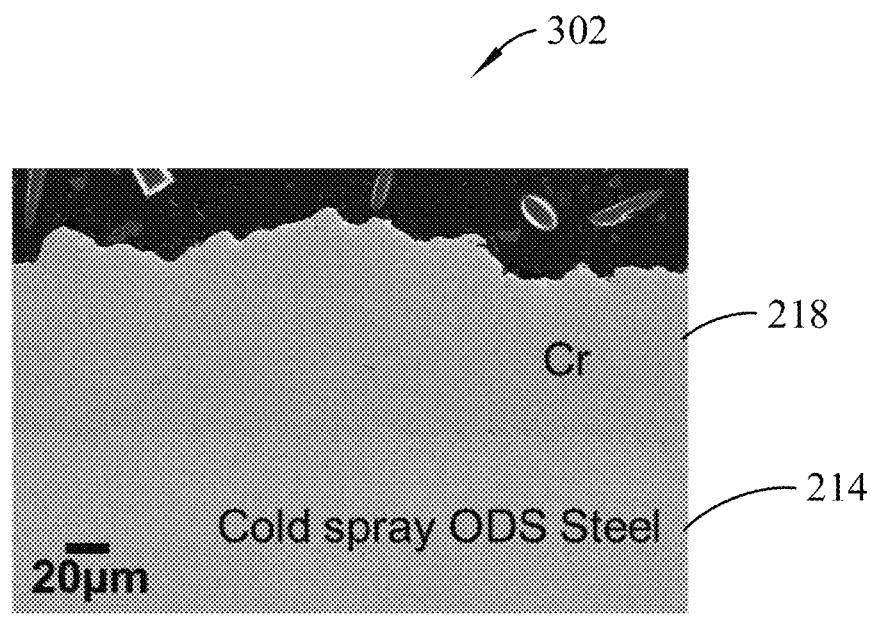
FIG. 5 is a micrograph section view of a free-standing ODS steel cladding tube comprising an ODS steel material with a protective outer coating with a pure chromium produced using the cold spray process of FIG. 2, according to at least one aspect of the present disclosure.

The cold spray process 200 described with reference to FIG. 2 provides a rapid, cost effective path to producing such oxidation-resistant coatings. An example of such coating is shown in FIG. 4, which is a micrograph section view of a free-standing ODS steel cladding tube 300 comprising an ODS steel layer 214 material with a protective outer layer 218 coating comprising an iron-chromium-aluminum alloy (FeCrAl or Fe20Cr5Al) produced using the cold spray process of FIG. 2, according to at least one aspect of the present disclosure. Although the inner layer 210 is not shown in FIG. 4 due to scaling considerations, it is located below the ODS steel layer 214. Another example of such coating is shown in FIG. 5, which is a micrograph section view of a free-standing ODS steel cladding tube 310 comprising an ODS steel layer 214 material with a protective outer layer 218 coating comprising chromium (Cr) produced using the cold spray process of FIG. 2, according to at least one aspect of the present disclosure. Although the inner layer 210 is not shown in FIG. 4 due to scaling considerations, it is located below the ODS steel layer 214. The protective outer layer 218, such as FeCrAl, Fe20Cr5Al, or pure Cr metal provides corrosion/oxidation resistance to the ODS steel cladding tube 230 in high temperature environments.

Figure 6:
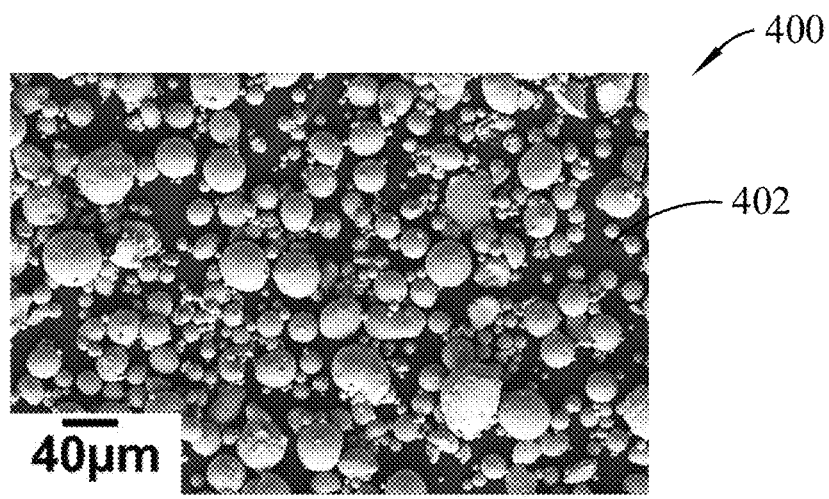
FIG. 6 is a micrograph view of morphology and size of ODS steel feedstock powder produced by a gas-atomization process, according to at least one aspect of the present disclosure.
Figure 7:
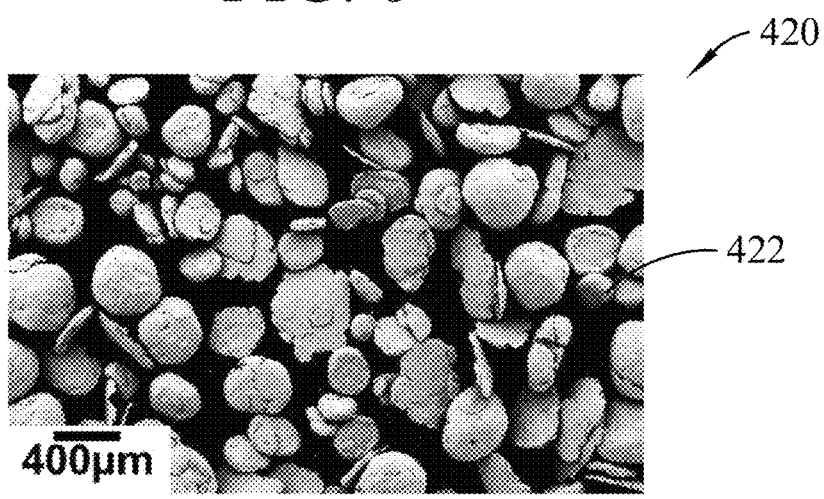
FIG. 7 is a micrograph view of morphology and size of ODS steel feedstock powder produced by ball-milling the gas-atomized powder with oxide nanoparticles of FIG. 6, according to at least one aspect of the present disclosure.
Figure 8:
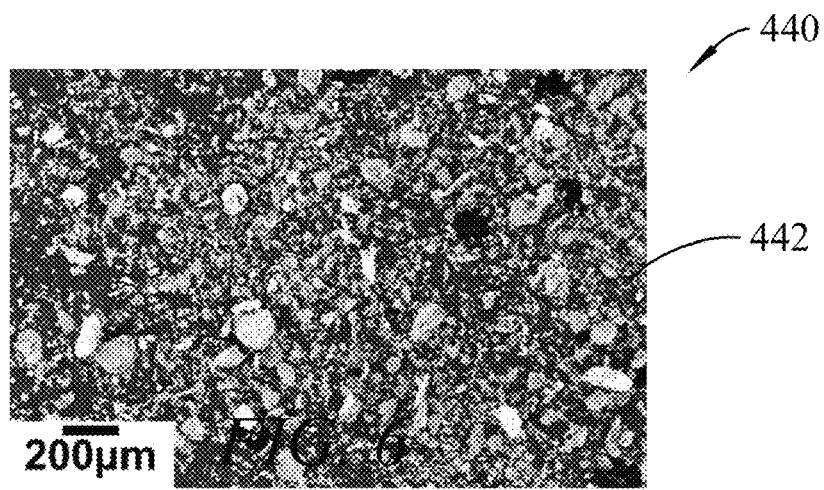
FIG. 8 is a micrograph view of morphology and size of ODS steel feedstock powder produced by cryogenic milling of the ball-milled gas-atomized powder of FIG. 7, according to at least one aspect of the present disclosure.

FIGS. 6-8 illustrate morphology and size of ODS steel feedstock powder depending on powder manufacturing methods where FIG. 6 is a micrograph view 400 of ODS steel feedstock powder 402 produced by a gas-atomization process, FIG. 7 is a micrograph view 420 of ODS steel feedstock powder 422 produced by ball-milling of the gas-atomized powder 402 with oxide nanoparticles (e.g., Y2O3) shown in FIG. 6, and FIG. 8 is a micrograph view 440 of ODS steel feedstock powder 442 produced by cryogenic milling of the ball-milled gas-atomized powder 422 shown in FIG. 7. Depending on the type of feedstock powder form, properties of ODS steel cladding tube 230 produced by the cold spray process 200 of FIG. 2 would be changed. The steel feedstock powder 402 shown in FIG. 6 is on a scale of 40 µm, the steel feedstock powder 422 shown in FIG. 7 is on a scale of 400 µm, and the steel feedstock powder 442 shown in FIG. 8 is on a scale of 200 µm.

The cold spray manufacturing process 200 described with reference to FIG. 2 may employ a variety of metal powder types as shown in FIGS. 6-8. Characteristics of feedstock powder is one factor to tailor the resultant microstructure of the cold spray ODS steel cladding tube 230. The cold spray manufacturing process 200 may produce ODS steel cladding tubes 230 using various types of feedstock powders produced with different production methods such as gas-atomization process, ball-milling process, cryogenic milling process, and powder with post-heat treatment. The powder manufacturing process influences the shape and size distribution, chemical composition, grain structure, compositional homogeneity, and mechanical properties (e.g., hardness) of the powder. The size and morphology of the feedstock powder depending on powder manufacturing route are shown in FIGS. 6-8. Feedstock powder may be selected based on desired performance of the cladding tube (e.g., microstructure, mechanical properties, and irradiation response) and economical benefit.

Figure 9:
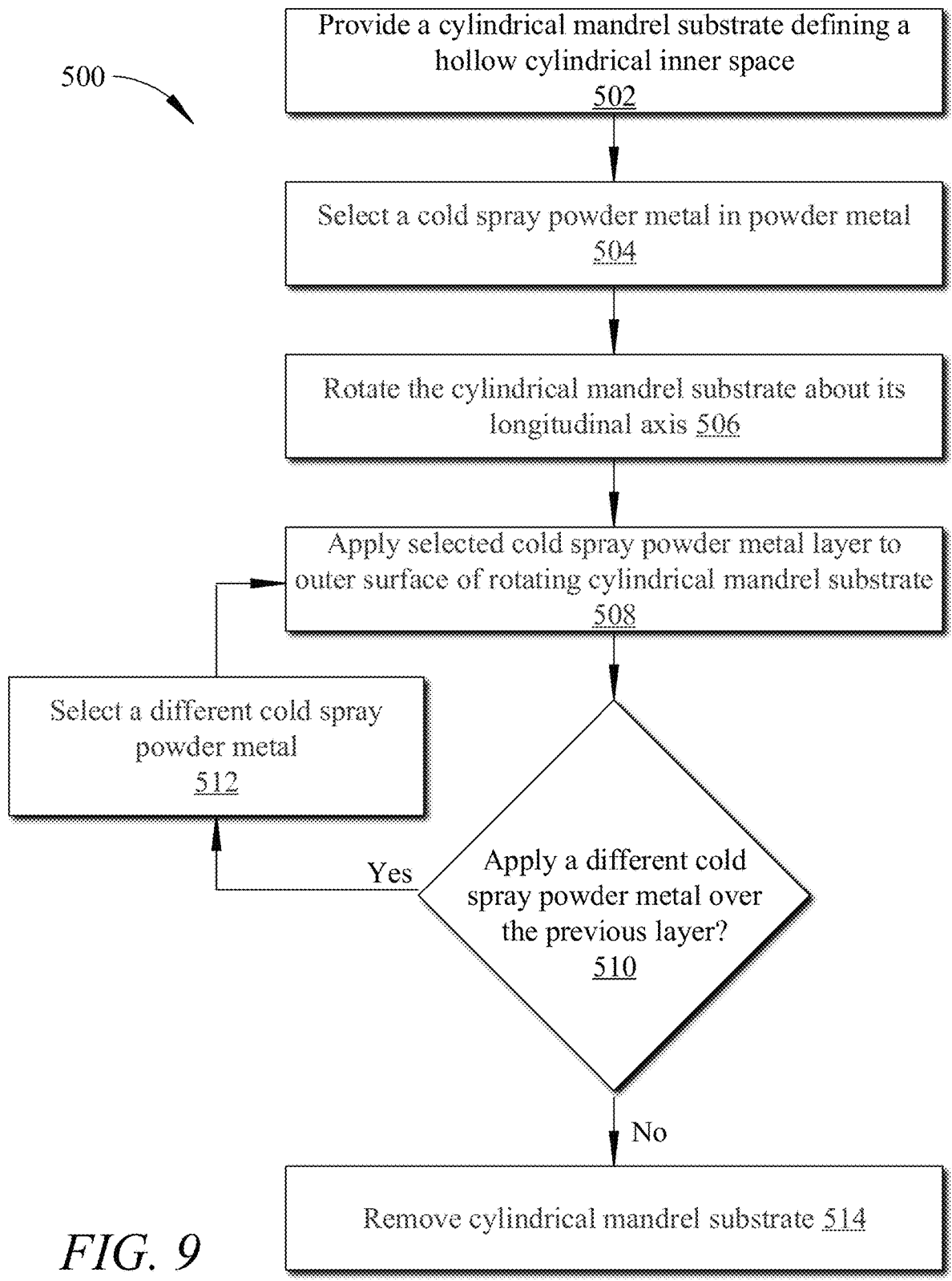
FIG. 9 is a method for manufacturing free-standing ODS steel cladding tubes with multi-layer structures using the cold spray process shown in FIG. 10, according to at least one aspect of the present disclosure.
Figure 10:
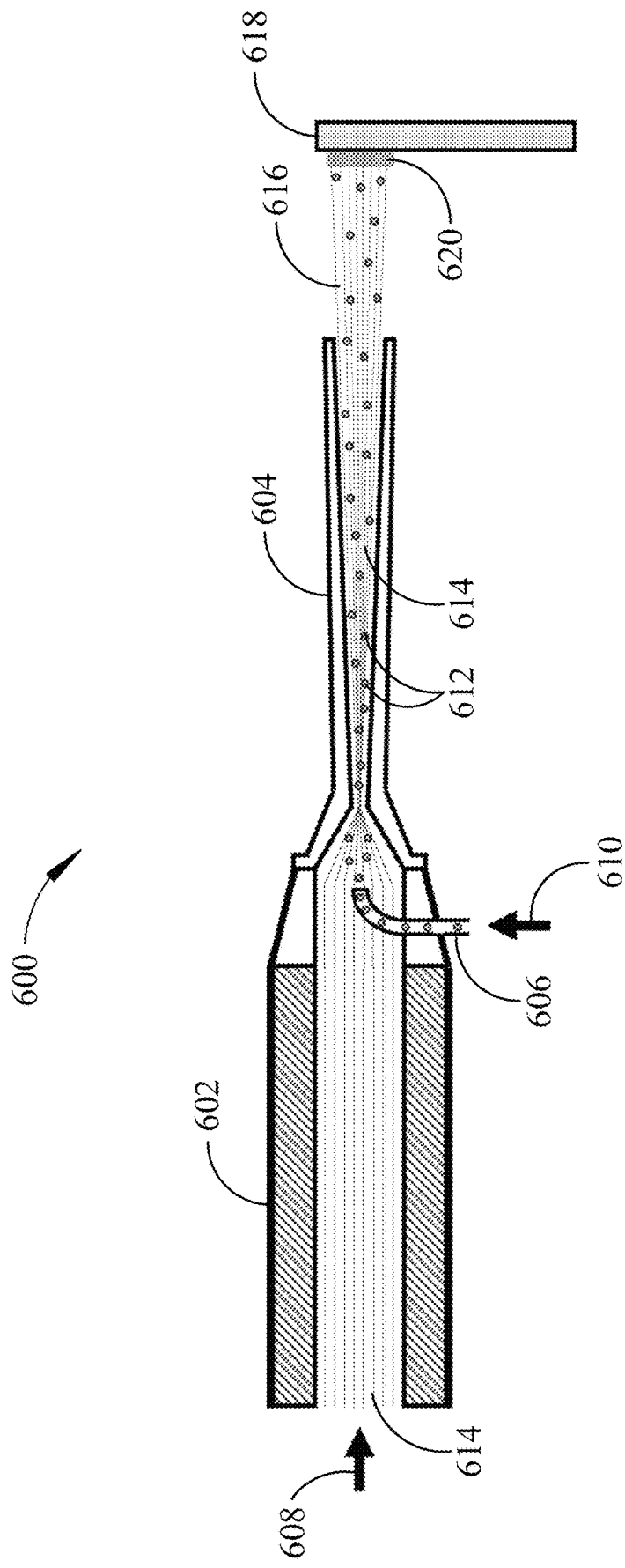
FIG. 10 illustrates a schematic diagram of a cold spray process, according to at least one aspect of the present disclosure.

FIG. 9 is a method 500 for manufacturing free-standing ODS steel cladding tubes with multi-layer structures using the cold spray process 600 shown in FIG. 10, according to at least one aspect of the present disclosure. With reference also to FIGS. 9 and 10, the method 500 comprises providing 502 a cylindrical mandrel substrate 618 defining a hollow cylindrical inner space. Pressurized gas 614 is introduced 608 into a heating element 602 fluidically coupled to a converging-diverging powder spray nozzle 604. A cold spray powder metal 612 is selected 504 and loaded into a hopper to be injected 610 by a powder feeder 606 into the powder spray nozzle 604 where it is mixed with the heated pressurized gas 614. The powder spray nozzle 604 emits a supersonic stream 616 of powder metal 612 mixed with the pressurized gas 614. The cylindrical mandrel substrate 618 is rotated 506 about its longitudinal axis. Next, the powder spray nozzle 604 is located proximate to the cylindrical mandrel substrate 618. A supersonic stream 616 of the selected cold (low temperature) powdered metal is applied 508 to the outer surface of the cylindrical mandrel substrate 618 while the powder spray nozzle 604 translates along the length of the cylindrical mandrel substrate 618. The thickness of the first powder metal layer 620 may be varied by traversing the powder spray nozzle 604 in a back and forth direction along the length of the cylindrical mandrel substrate until the desired thickness of the first powder metal layer is achieved. In another aspect, thickness of the layer 620 may be controlled by adjusting the traverse speed of the powder spray nozzle 604. For example, a faster traverse speed may be employed to deposit a thinner layer 620 and a slower traverse speed may be employed to deposit a thicker layer 620. Next, according to the method 500, determine 510 whether to apply a different cold spray powder layer over the previous powder metal layer 620. If "Yes," a different powder metal is selected 512 and loaded into the hopper and the second powder metal material is injected 610 into the powder spray nozzle 604 through the powder feeder 606 where it is mixed with the pressurized gas 608, exits the powder spray nozzle 604, and is applied 508 over the first powder metal layer 620 until a desired thickness of the second powder metal layer is achieved. The determination 510 is repeated until a plurality of "n" different powder metal layers are applied 508 on the cylindrical mandrel substrate 618 to form a multi-layer tube structure.

The cold spray powder metal layers that can be applied by the method 500 include an inner liner layer, intermediary layers, and an outer layer. The inner layer may be made of a refractory metal comprising vanadium, tantalum, tungsten, rhenium, niobium, chromium, zirconium, or molybdenum, or combinations thereof, to provide a diffusion barrier in nuclear power applications. Additional inner layer materials that have in general a low solid solubility with the fuel and intermediate structural layer. The intermediate layers may be made of ODS steel. The outer layer may be made of chromium or chromium alloys such as pure chromium (Cr), iron-chromium-aluminum (FeCrAl, Fe20Cr5Al, or FeCrAlY), molybdenum, rhenium, niobium, tantalum, nickel, tungsten, beryllium or alloys thereof including MCrAlY's, or FeCrSi to provide corrosion/oxidation resistance for the ODS steel or other structural layer. The thickness of the inner layer (e.g., the refractory layer) is selected from a range of 10 μm ($\sim 3.94 \times 10^{-4}$ in.) to 200 μm ($\sim 7.87 \times 10^{-3}$ in.). The thickness of the intermediary layer (e.g., the cladding layer) is selected from a range of 200 μm ($\sim 7.87 \times 10^{-3}$ in.) to 1.00 mm ($\sim 3.94 \times 10^{-2}$ in.). The thickness of the outer layer (e.g., corrosion protective layer) is selected from a range of 1 μm ($\sim 3.94 \times 10^{-5}$ in.) to 100 μm ($\sim 3.94 \times 10^{-3}$ in.).

Once a desired number of different "n" layers are deposited on the cylindrical mandrel substrate 618, the method proceeds along the "No" path and the cylindrical mandrel substrate 618 is removed 514. In one aspect, the cylindrical mandrel substrate 618 is removed 514 by a chemical dissolution process or low temperature thermal treatment depending on mandrel material, to produce either a free-standing monolithic or multi-layer tube structure. In one aspect, the cylindrical mandrel substrate 618 is made of an aluminum-alloy material that can dissolved in a sodium-hydroxide solution. In one aspect, the cylindrical mandrel substrate 618 is made of a low melting point or low boiling point metal or alloys or are soluble in solvent, possible materials include magnesium, zinc, or alloy combinations thereof.

The disclosed manufacturing technology is revolutionary and is fundamentally different from existing manufacturing processes. The disclosed cold spray manufacturing process 600 optimizes the microstructure and the materials and ultimately improves material performance to provide several key advantages over exiting processes. The tubing made using this new process will be highly competitive in manufacturing cost, efficiency, yield, and quality. The anticipated performance will be much better than current products from the market.

Cladding material development and selection is one of the key elements in advanced reactor design. The performance of the fuel highly depends on the cladding material, and ODS provides superior mechanical properties and irradiation resistance which are critical for advanced reactor environments as the temperature and flux are much higher than LWRs.

Although certain aspects have been illustrated and described herein for purposes of description, a wide variety of alternate and/or equivalent aspects or implementations calculated to achieve the same purposes may be substituted for the aspects shown and described without departing from the scope of the present disclosure. This application is intended to cover any adaptations or variations of the embodiments discussed herein Examples of the method according to various aspects of the present disclosure are provided below. An aspect of the method may include any one or more than one, and any combination of, the examples described below.

Example 1. A method for manufacturing free-standing cladding tubes with multi-layer structures, the method comprising: providing a cylindrical mandrel substrate defining a hollow cylindrical inner space; selecting a first cold spray powder metal; rotating the cylindrical mandrel substrate; applying the first cold spray powder metal to an outer surface of the cylindrical mandrel substrate to form a first layer; and removing the cylindrical mandrel substrate.

Example 2. The method of Example 1, wherein the thickness of the first layer is selected from a range of 10 μm to 5000 μm.

Example 3. The method of any one of Examples 1-2, wherein the first cold spray powder metal comprises a refractory metal.

Example 4. The method of Example 3, wherein the refractory metal comprises comprising vanadium, tantalum, rhenium, niobium, tungsten, chromium, zirconium, or molybdenum, or combinations thereof.

Example 5. The method of any one of Examples 1-4, wherein prior to removing the cylindrical mandrel substrate, the method comprises: selecting a second cold spray powder metal; and applying the second cold spray powder metal over the first layer.

Example 6. The method of Example 5, wherein the thickness of the second layer is selected from a range of 200 μm to 1.00 mm.

Example 7. The method of any one of Examples 5-6, wherein the second cold spray powder metal comprises an oxide dispersion strengthened (ODS) steel powder.

Example 8. The method of Example 7, wherein the ODS steel powder is cryogenically milled.

Example 9. The method of any one of Examples 5-8, wherein prior to removing the cylindrical mandrel substrate, the method comprises: selecting a third cold spray powder metal; and applying the third cold spray powder metal over the second layer.

Example 10. The method of Example 9, wherein the thickness of the third layer is selected from a range of 1 μm to 100 μm.

Example 11. The method of any one of Examples 9-10, wherein the third cold spray powder metal comprises a corrosion/oxidation resistant material.

Example 12. The method of Example 11, wherein the corrosion/oxidation resistant material comprises chromium or a chromium alloy.

Example 13. The method of Example 12, wherein the chromium alloy comprises FeCrAl or Fe20Cr5Al.

Example 14. The method of any one of Examples 11-13, wherein the oxidation resistant material is suited for the type of environment such as molybdenum, rhenium, niobium, tantalum, FeCrAl, FeCrAlY and FeCrSi of, alloys thereof for lead fast reactors; nickel, molybdenum, or tungsten, of alloys thereof for molten salts; beryllium, tungsten, or alloys thereof for fusion applications.

Example 15. The method of any one of Examples 1-14, wherein removing the cylindrical mandrel substrate comprises dissolving the cylindrical mandrel substrate.

Example 16. The method of Example 15, wherein the cylindrical mandrel substrate is made of aluminum-alloy or magnesium-alloy and the cylindrical mandrel substrate is dissolved inside out using a sodium-hydroxide solution.

Example 17. The method of any one of Examples 1-16, wherein removing the cylindrical mandrel substrate comprises thermal treatment including melting or boiling to remove the cylindrical mandrel substrate.

Example 18. The method of Example 17, wherein the cylindrical mandrel substrate is made of a zinc-alloy removed by heating above its melting point.

The invention claimed is:

1. A method for manufacturing a nuclear reactor cladding tube, the method comprising:
   providing a cylindrical mandrel substrate defining a hollow cylindrical inner space;
   selecting a first cold spray powder metal;
   rotating the cylindrical mandrel substrate;
   applying the first cold spray powder metal to an outer surface of the cylindrical mandrel substrate to form a first layer;
   selecting a second cold spray powder metal;
   applying the second cold spray powder metal over the first layer to form a second layer, wherein the second cold spray powder metal comprises an oxide dispersion strengthened (ODS) steel powder; and
   removing the cylindrical mandrel substrate.

2. The method of claim 1, wherein the thickness of the first layer is selected from a range of 10 μm to 5000 μm.

3. The method of claim 1, wherein the first cold spray powder metal comprises a refractory metal.

4. The method of claim 3, wherein the refractory metal comprises vanadium, tantalum, rhenium, niobium, tungsten, chromium, zirconium, or molybdenum, or combinations thereof.

5. The method of claim 1, wherein the thickness of the second layer is selected from a range of 200 μm to 1000 μm.

6. The method of claim 1, wherein the ODS steel powder is cryogenically milled.

7. The method of claim 1, wherein prior to removing the cylindrical mandrel substrate, the method comprises:
   selecting a third cold spray powder metal; and
   applying the third cold spray powder metal over the second layer to form a third layer.

8. The method of claim 7, wherein the thickness of the third layer is selected from a range of 1 μm to 100 μm.

9. The method of claim 7, wherein the third cold spray powder metal comprises a corrosion and oxidation resistant material.

10. The method of claim 9, wherein the corrosion and oxidation resistant material comprises chromium or a chromium alloy.

11. The method of claim 10, wherein the chromium alloy comprises FeCrAl or Fe20Cr5Al.

12. The method of claim 9, wherein the corrosion and oxidation resistant material comprises molybdenum, a molybdenum alloy, a molybdenum-rhenium alloy, niobium, tantalum, FeCrAl, $FeCrAlY_1$ FeCrSi of a nickel alloy, a beryllium alloy, a tungsten alloy, or a combination thereof.

13. The method of claim 1, wherein removing the cylindrical mandrel substrate comprises dissolving the cylindrical mandrel substrate.

14. The method of claim 13, wherein the cylindrical mandrel substrate is made of aluminum-alloy or magnesium-alloy and the cylindrical mandrel substrate is dissolved inside out using a sodium-hydroxide solution.

15. The method of claim 1, wherein removing the cylindrical mandrel substrate comprises thermal treatment including melting or boiling to remove the cylindrical mandrel substrate.

16. The method of claim 15, wherein the cylindrical mandrel substrate is made of a zinc-alloy removed by heating above its melting point.

17. The method of claim 1, further comprising placing nuclear fuel pellets inside the nuclear reactor cladding tube after removing the cylindrical mandrel substrate.

18. The method of claim 1, wherein the cylindrical mandrel comprises a length, and wherein applying the first cold spray powder metal comprises applying the first cold spray power metal along the length of the cylindrical mandrel to form a nuclear reactor cladding tube having a length selected from range of 2.5 m and 5 m.

19. The method of claim 7, wherein the first layer comprises vanadium or a vanadium alloy, wherein the second layer comprises ODS steel, and wherein the third layer comprises chromium or a chromium alloy.

20. The method of claim 19, wherein the ODS steel comprises yttrium oxide.

* * * * *